Nov. 3, 1936.  H. SCHNEIDER  2,059,713
ENGINE PISTON
Filed May 19, 1933   2 Sheets-Sheet 1
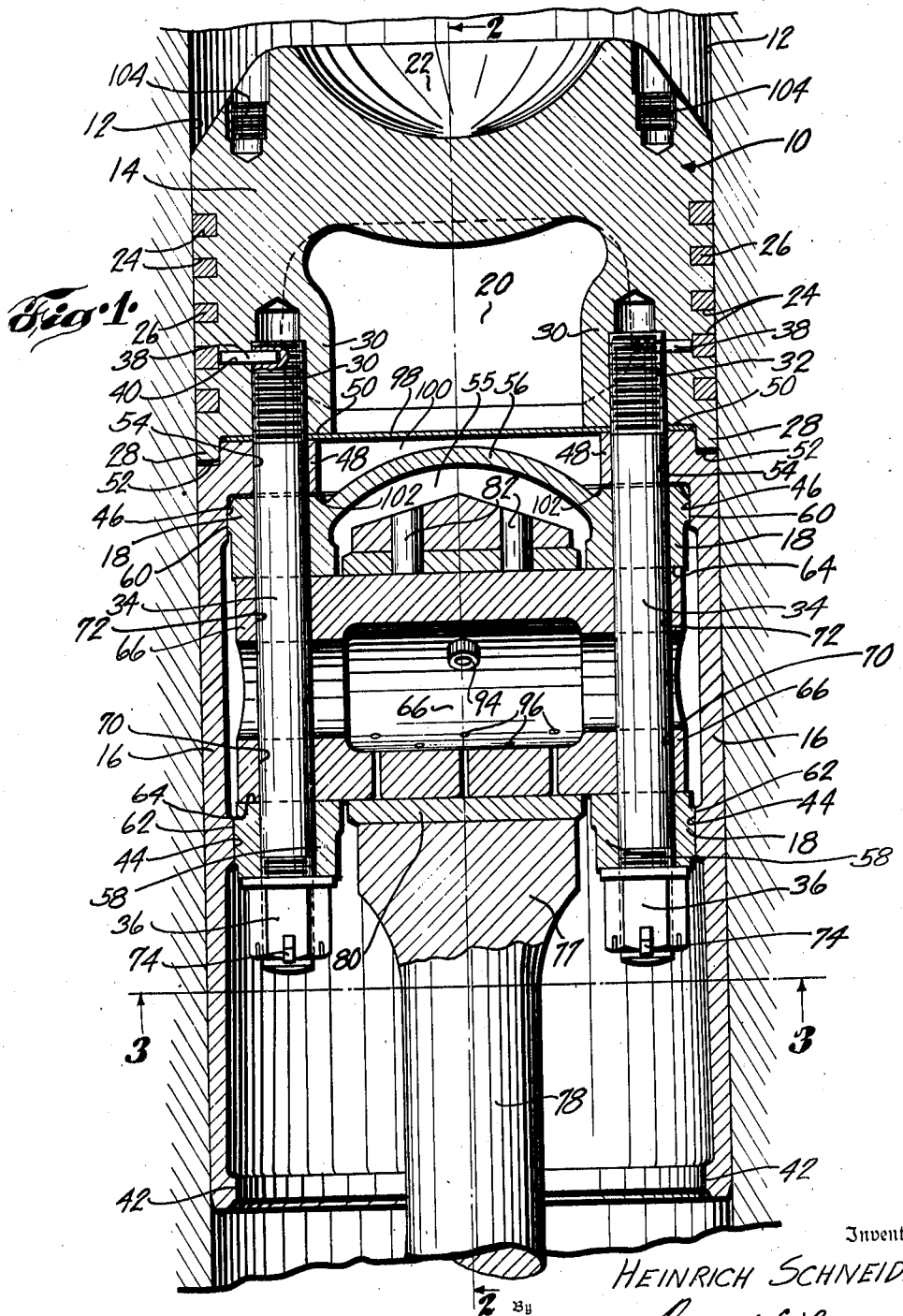
Inventor
HEINRICH SCHNEIDER
By
Attorney

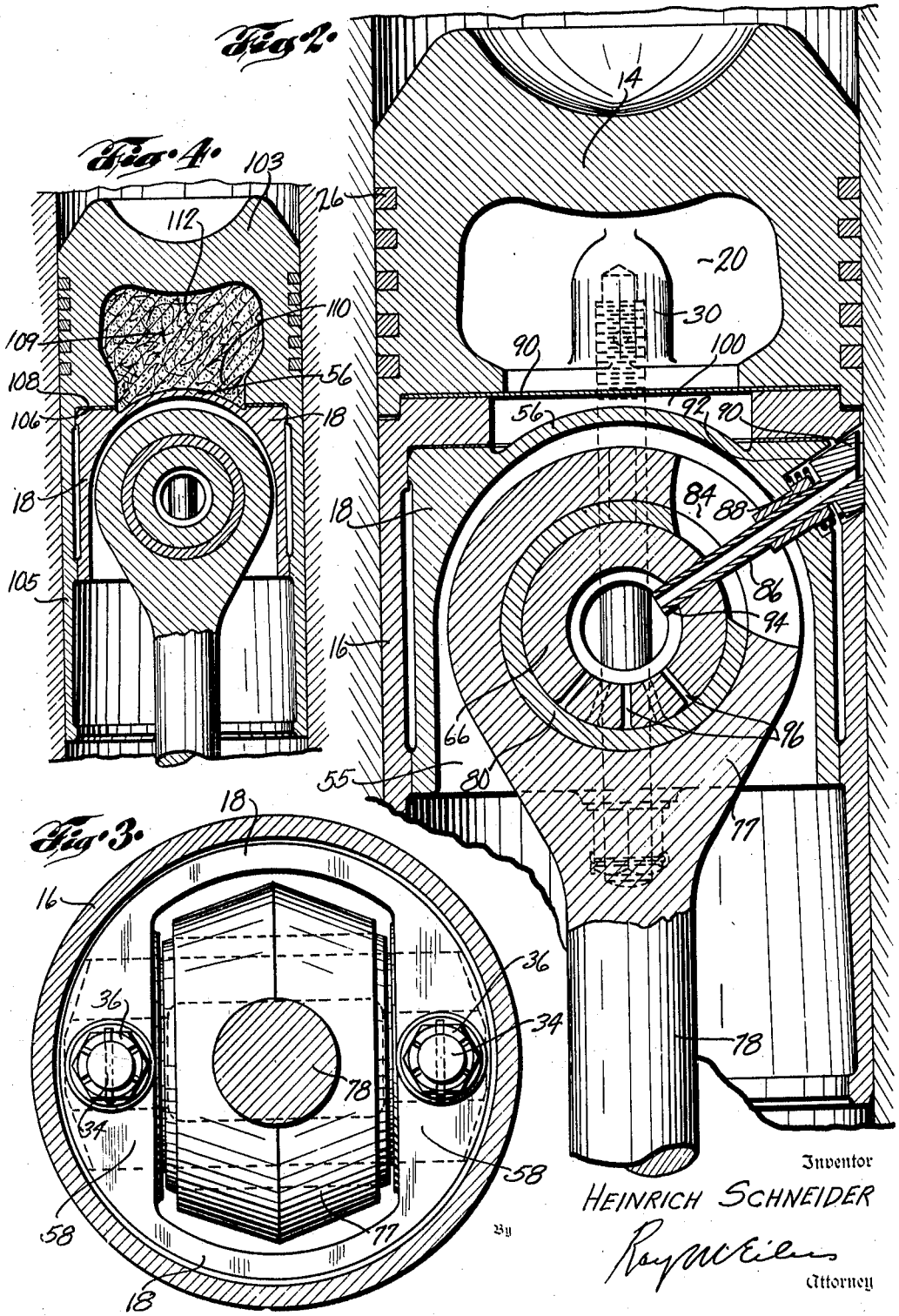

Patented Nov. 3, 1936

2,059,713

UNITED STATES PATENT OFFICE 2,059,713

ENGINE PISTON

Heinrich Schneider, Beloit, Wis., assignor to Fairbanks, Morse & Co., Chicago, Ill., a corporation of Illinois Application May 19, 1933, Serial No. 671,821

4 Claims. (Cl. 309—16)

This invention relates to improvements in engine pistons, and more particularly to an improved piston for high compression engines, such as, for example, oil engines of the two cycle crank case scavenging type.

In certain of the older prevailing types of pistons employed in high compression oil engines, particularly engines of the two cycle crank case scavenging type, considerable trouble has been encountered with the heating and burning out of wrist pin bearings as a result of an insufficient dissipation of the heat conducted from the piston head portion, to the lower portions of the piston assembly. In a number of instances, an attempt has been made to remedy the difficulty by constructing a relatively thin piston head and skirt portion. Obviously with such a piston construction, less heat will be conducted to the wrist pin and bearing. But a serious objection to this method of obtaining a fairly cool wrist pin and bearing, lies in the frequent cracking of the piston crown, as a direct result of the reduced cross sections of metal incident to the thin head construction. Hence, an object of the present invention is to provide an improved piston for high compression engines, in which the wrist pin, connecting rod, and bearing bushing are substantially insulated from the head portions of the piston exposed to the greatest heat of combustion.

Another object is attained in the provision of a piston for high compression engines, in which the several parts are constructed and assembled in such a manner that the frictional heat generated between the wrist pin and crank arm bearing is conducted to a relatively cool portion of the piston, and there effectively dissipated.

A further object is to provide an improved piston construction in which the wrist pin is mounted in a separate bracket member which is secured within a skirt portion of the piston assembly, the bracket being secured in such a manner as to distribute the side forces set up in operation, evenly about the circumferential sections of the skirt.

Yet another object of the invention is attained in an improved piston assembly embodying, in combination with a head and skirt portion, a heat insulating expedient operative to deter a direct transfer of heat from the head of the piston, to the wrist pin and bearing assembly, and compelling heat transfer to take place along paths circumventing said assembly, and leading directly, for purposes of radiation, to the outermost or skirt portions of the structure.

An object kindred to the foregoing is attained in a piston assembly providing, in combination with a head portion, a skirt portion and a wrist pin support, means serving first for expediting the conduction of heat from the head to the skirt proper for radiation to the cylinder walls, and in further serving to insulate the wrist-pin-supporting parts of the piston, from the hotter parts of the piston.

A still further object is to provide an improved piston construction built up of assembled portions, wherein the inertia forces of the several component piston portions, are transmitted directly to the wrist pin and connecting rod.

Further objects and advantages will appear from the following description of certain embodiments of the invention selected as illustrative of the invention, and from the appended drawings, in which:

Fig. 1 is a longitudinal sectional elevation of a preferred form of piston embodying the improvements constituting the present invention; Fig. 2 is a further longitudinal sectional elevation of the piston, as taken along line 2—2 in Fig. 1; Fig. 3 is a transverse sectional elevation, as taken along line 3—3 in Fig. 1; and Fig. 4 is a sectional elevation, on a reduced scale, of a modification in the piston construction of Figs. 1 and 2, and taken along a plane corresponding to that of Fig. 2.

Referring, now, to the drawings by numerals of reference, 10 designates, generally, a preferred form of oil engine piston arranged to reciprocate within a cylinder 12, provided by choice, with a water jacket, (not shown). The piston is composed of a head section 14, a skirt or sleeve section 16, and a wrist pin and bearing bracket section 18. The head section 14 is preferably an aluminum alloy casting, a metal of this type being desirable because of its light weight and heat-conducting qualities. However, any other suitable material or alloy may be substituted, as desired. The material of the skirt section 16 is preferably cast iron, because of its wearing quality, but an aluminum skirt may be employed, if desired, and in the latter case, the head and skirt sections may be formed as a single section, such a construction being illustrated in the modification shown in Fig. 4. It will be noted in Figs. 1 and 2, that, except for a small aperture adjacent the head end of the skirt, which is provided for an oiling device of scraper type, presently to be described, the skirt or sleeve section 16 has practically an unbroken or imperforate external cylindrical surface. Hence the work of machining the surface of the section is materially lessened, and a more perfect cylinder is made possible which will permit the use of smaller bore clearances. The bracket member 18 is preferably an aluminum casting, although any other suitable light weight metal or alloy may be employed, a light weight material being preferable in order to lessen the total weight of the piston assembly. The bracket member and skirt section are so associated in assembly, by means of parts hereinafter described, that the side stresses set up in the bracket during operation, are evenly distributed about the circumference of the skirt, thereby minimizing warping of the skirt section.

The head section 14 is formed with a central chamber 20, open on the under side of the section, and provided with a cupped or concave crown portion 22, which is of a certain advantage in absorbing expansion stresses incident to the high temperature of the piston crown, and preventing the otherwise frequent cracking of piston tops after a period of use. A series of annular slots 24 are provided in the circumferential surface of the section to receive the usual piston packing or sealing rings 26. The lower circumferential edge portion of the head section is formed as a depending flange 28 for a purpose presently to appear. Diametrically opposite wall portions are expanded inwardly, within the chamber 20, to form thickened or boss portions 30, so that the wall portions may be drilled and threaded, as at 32, to receive correspondingly threaded ends of assembly studs 34. There are preferably two such studs, one in each expanded wall section, and each having its free end threaded to receive an assembly nut 36, for a purpose presently appearing. The studs are each securely held in its tapped aperture 32 by a lock pin 38 extending, through a lateral wall aperture 40, and into a slot well, drilled in the stud end. As shown in Fig. 1, the aperture 40 extends inwardly from the bottom of one of the annular ring slots 24, hence with a sealing ring in the slot, the lock pin is effectively held against any endwise movement in the aperture.

The skirt section 16, formed as a chambered cylindrical sleeve, open on both ends, is provided with inwardly extending arcuate seats or boss portions 42, 44 and 46, the boss 42 stiffening the lower end of the skirt, and the bosses 44, positioned substantially midway of the sleeve ends, and 46, adjacent the upper end of the skirt, forming annular seating members for the bracket 18 presently to be described. The upper end portion of the skirt extends inwardly, as at 48, to engage the bottom portion 50 of the head section 14. The circumferential edge of the upper end of the skirt section is annularly recessed, as at 52, to receive the flange 28 on the head section, the flange and seat being provided as a rabbeted joint, for guiding the sections into assembled relation, and coaxially positioning the parts in assembly. Apertures 54 are provided in the skirt portion 48, to receive therethrough, the assembly studs 34.

The cylindrical frame or bracket 18 is formed with a central chamber 55 having a dome-shaped head portion or partition 56. The chamber is open on its bottom side, and is provided with oppositely disposed thickened wall portions 58, for a purpose which will presently appear. A circumferential boss or arcuate seat 60 adjacent the upper end of the bracket, and a similar boss 62 on the lower end thereof, are provided to engage, respectively, the bosses 46 and 44 on the skirt section, the associated pairs of bosses forming spacing and aligning means for positioning the bracket member in assembly within the skirt section, and serving evenly to transfer and distribute all lateral stresses of the rod and pin assembly, to the skirt portion 16 of the piston.

A laterally extending aperture or transverse bore 64, through the central portion of each wall 58, is provided to receive one end of an open-ended wrist pin 66, the pin having a central chamber 68 for a purpose presently appearing. The wall portions 58 of the bracket and the ends of the wrist pin are suitably apertured as at 70 and 72, respectively, to receive therethrough the body or shank portions of the studs 34, substantially as shown in Fig. 1. The threaded lower ends of the studs extend below the bracket structure to receive the nuts 36, which, when drawn up, compress the bracket structure and the portion 48 of the skirt section into assembled relation against the lower surface 50 of the piston head section 14. The studs passing through the ends of the wrist pin, effectively anchor the pin in the bracket structure. Lock pins or cotter keys 74 in the ends of the bolts 34 prevent the nuts 36 from working loose during piston operation.

The upper end 77 of a connecting rod 78, and a bearing bushing 80, are pivotally seated upon the wrist pin, the bushing being preferably secured to the rod end by suitable dowel pins 82, so that the rod end and bushing oscillate together about the wrist pin. As shown in Fig. 2, the arm end and bushing are cut away or notched at 84 in order to clear a stem or conduit portion 86 of a scraper type bushing oiler 88, as the crank and bushing oscillate. The scraper end 90 of the oiler is seated in an aperture 92 extending through the skirt and bracket sections, adjacent the upper ends thereof. It is to be understood that the oiler device illustrated in Fig. 2 forms no part of the present invention, but is fully described and claimed in an application of John H. Lentell, Jr., filed September 22, 1930, Serial No. 483,506. The end 94 of the conduit 86 extends laterally through a central portion of the wrist pin, and into the chamber or oil reservoir 68, thereby delivering oil to the chamber as the piston is reciprocated. A series of spaced oil feeder apertures 96, extending through the lower wall portion of the chamber, carry the lubricating oil from the reservoir in the pin, to the bearing surface of the bushing 80, as will clearly appear from Fig. 2.

A metal bridge or closure 98, formed of a good heat conducting material, such as copper or brass, is interposed between the lower end of the piston head and the upper end of the skirt section, this plate closing the chamber 20 in the head section, and providing a path for the conduction of heat in the head section to the skirt section, the heat following, for the most part, a path which circumvents the bracket section. The air chamber or pocket 100, formed by the disc and domed head 56 of the bracket structure, further insulates the bracket and wrist pin from the relatively hotter head section. The heat conducted to the skirt section is further deterred from being carried over to the bracket structure, at the juncture of the upper end of the bracket and the lower surface of the skirt portion 48, by a gasket 102 of a heat insulating material, preferably asbestos or bakelite, interposed between the sections at the juncture.

It results from the foregoing structure that the bracket, wrist pin, and connecting rod end are maintained in a fairly cool condition during the operation of the engine. The heat generated by the friction between the wrist pin and bearing bushing 80, is conducted through the pin to the bracket structure, and to the lower portion of the skirt section 16 through the respective contacting boss portions 44 and 62 on the skirt and bracket sections. The greater portion of the frictional bearing heat follows the above indicated path for the reason that the running temperature of the bearing is higher than that of the lower portion of the skirt section.

To aid in the removal of the piston from the cylinder for repair or other purposes, threaded apertures 104 are provided in the piston head portion to receive the threaded ends of hooks or other devices which are usually employed for this purpose.

Fig. 4 illustrates a modified form of piston in which the head section 103 and skirt section 105 are shown as an integral unit, the unit being preferably cast from aluminum alloy. A heat insulating gasket 106 is employed between the upper end of the bracket structure 18, which may be identical with that of Fig. 1, and the lower surface 108 of the piston head, the gasket serving to prevent the transfer of heat from the head to the bracket and wrist pin, substantially as in the piston construction of Fig. 1. It will be noted that, in the modified arrangement of the bracket and piston head, the domed head portion 56 of the bracket substantially closes the opening 110 to the piston head recess or chamber 109. To insulate the pin and bracket assembly from the heat within the recess 109, the recess is preferably filled with a body of fibrous heat insulating material 112 of light weight, asbestos wool having been found suitable for this purpose.

It is evident from the manner of assembling the several parts forming the present improved piston, that the inertia forces in each part are transmitted directly to the wrist pin and crank arm. The result, therefore, is a smoother working piston which substantially reduces operating vibrations. The particular improved construction of the piston, which results in a fairly cool wrist pin bearing assembly, extends the life of the bearing bushing, and adds materially to the economical operation of the engine in which it is used.

It is to be understood that the invention is not to be limited by the specific forms of the presently described embodiments, as they may be altered or otherwise modified without departing from the spirit and full intended scope of the invention, as defined in the following claims.

I claim:

1. A piston including, in combination, a chambered head section having a crown portion of concavo-convex aspect, a hollow skirt section, a bearing bracket for a wrist pin assembly, detachably mounted within the skirt section, a wrist pin in said bracket, the bracket consisting of a cylindrical member having a dome-shaped head partition and provided with a cross bore adapted to receive a wrist pin, the bracket being further provided with diametrically opposed bores, each of a trend longitudinally of the piston, arcuate seat portions near the ends of the bracket, each adapted to seat against a correspondingly curved internal surface of the skirt, for positioning said bracket with respect to said skirt, and in heat conducting relation therewith, a lateral bore extending through each end portion of the wrist pin, and a pair of holding elements extending through the said longitudinal bracket bores and said wrist pin bores, and into detachable engagement with the head section of the piston, a heat-insulating element detachably disposed between the skirt and bracket, and a heat-conducting bridge element disposed between said head section and skirt, said last named element being spaced from the crown of said head section and from the bracket partition.

2. In a piston, a hollow head portion provided with downwardly opening threaded seats, a unitary skirt provided with an inwardly projecting flange at its upper end, a wrist pin assembly including a wrist pin and a substantially cylindrical bearing bracket for the pin, disposed within the skirt just below the flange, a pair of bolts extending transversely through the pin bracket and skirt flange into the threaded seats of the head a disc of conducting material constituting a partition detachably disposed between the upper surface of the skirt flange and the lower surface of the head, and a disc of insulating material disposed between the upper surface of the pin bracket and the lower surface of the skirt flange.

3. In a piston, a hollow head portion provided with downwardly opening threaded seats, a unitary skirt provided with an inwardly projecting flange at its upper end, a wrist pin assembly including a wrist pin and a substantially cylindrical bearing bracket for the pin, disposed within the skirt just below the flange, and in substantially greater part in spaced relation from the walls of the skirt, a pair of bolts extending transversely through the pin bracket and skirt flange into the threaded seats of the head, a disc of conducting material constituting a partition detachably disposed between the upper surface of the skirt flange and the lower surface of the head, and a disc of insulating material disposed between the upper surface of the pin bracket and the lower surface of the skirt flange.

4. In a piston, a hollow head portion provided with downwardly opening threaded seats, a unitary skirt provided with an inwardly projecting flange at its upper end, a wrist pin assembly including a wrist pin and a substantially cylindrical bearing bracket for the pin, detachably disposed within the skirt, with the greater portion of its walls spaced from the walls of the skirt to provide an air-space therebetween, the bracket having a dome-shaped head partition, a pair of bolts extending transversely through the pin bracket and skirt flange into the threaded seats of the head, a disc of conducting material constituting a partition detachably disposed between the upper surface of the skirt flange and the lower surface of the head, said partition being spaced from the bracket head partition, and a disc of insulating material disposed between the upper surface of the pin bracket and the lower surface of the skirt flange.

HEINRICH SCHNEIDER.